J. H. VINTON.
Machine for Cutting Screw Threads.
No. 233,821. Patented Oct. 26, 1880.
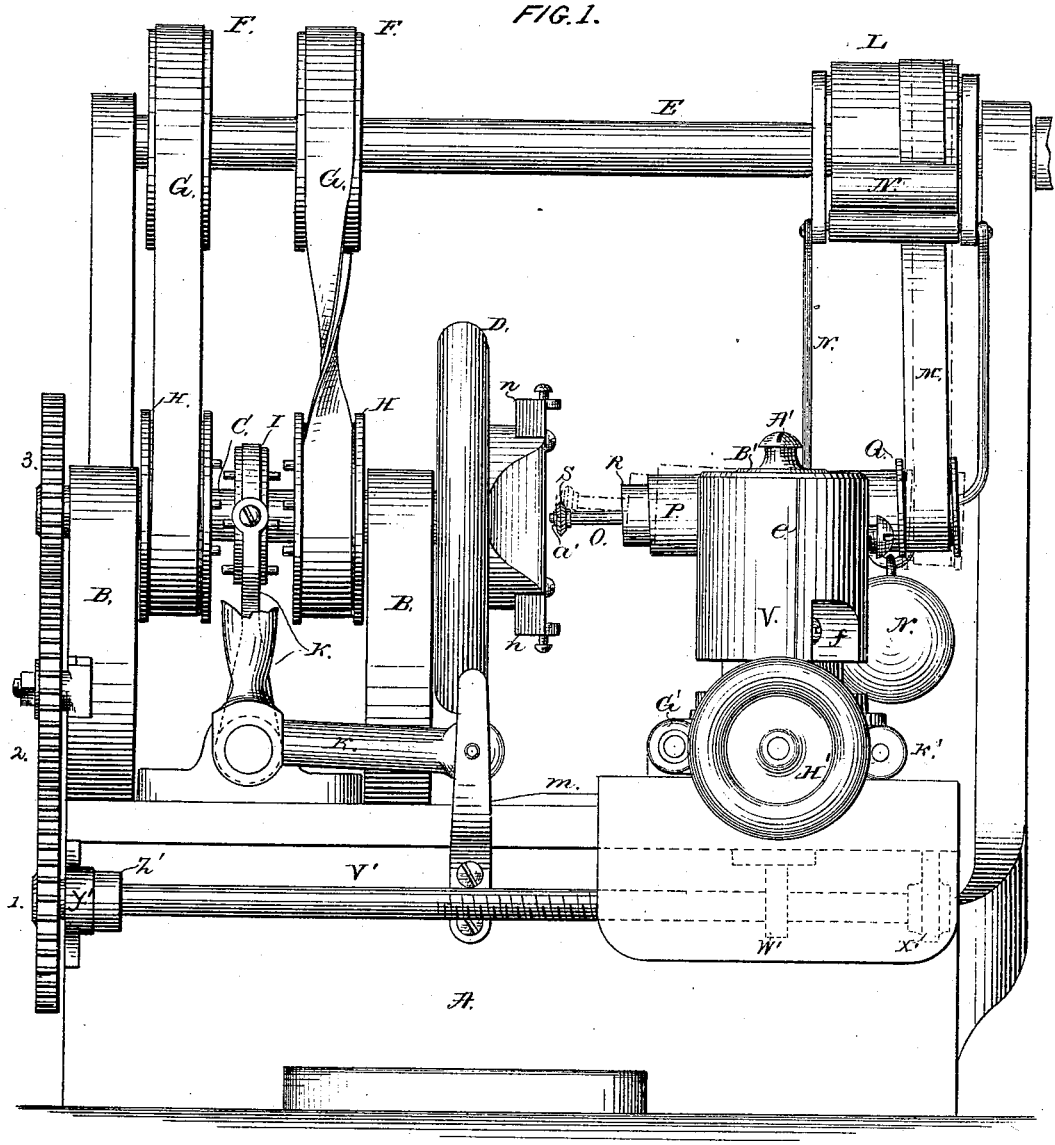

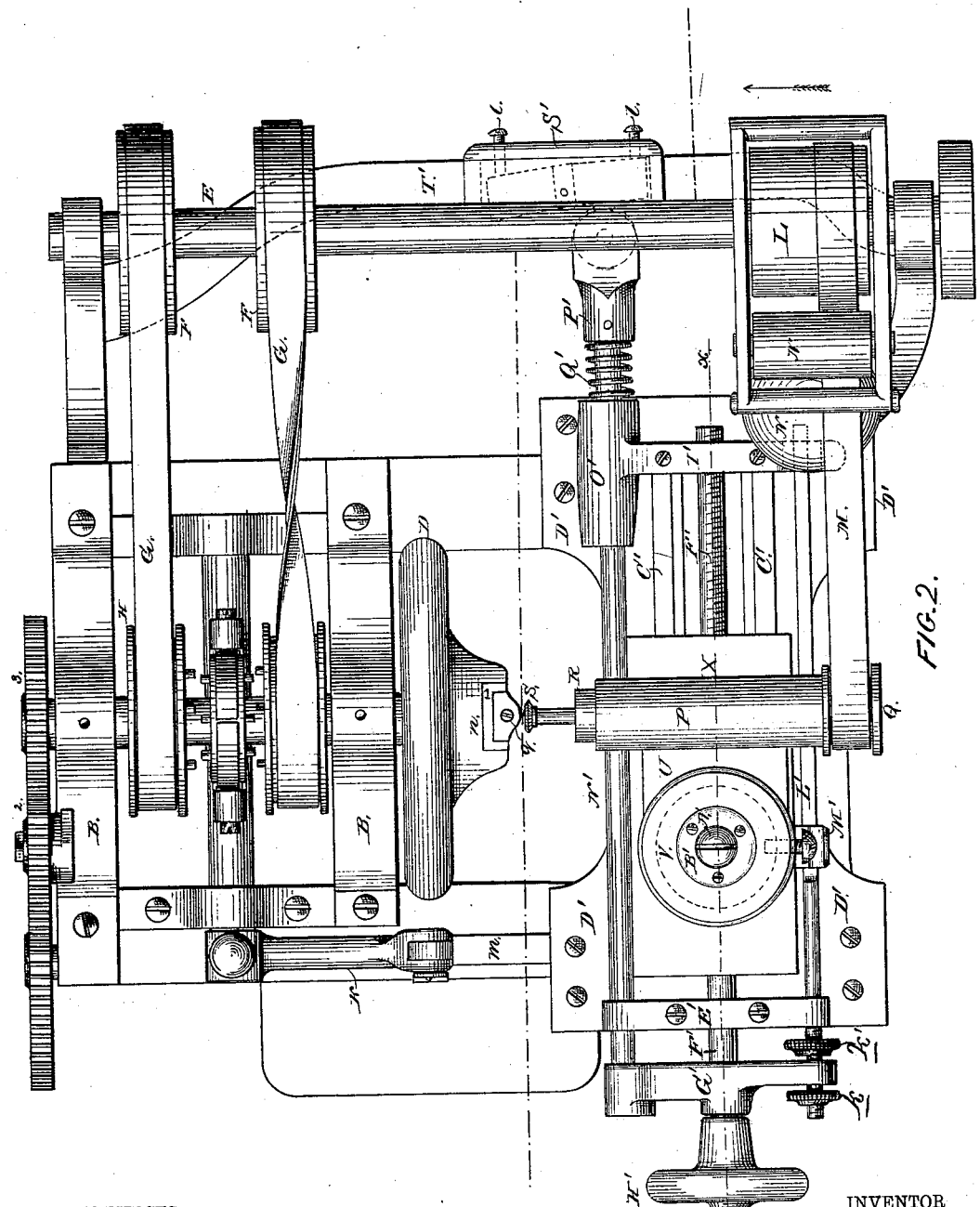

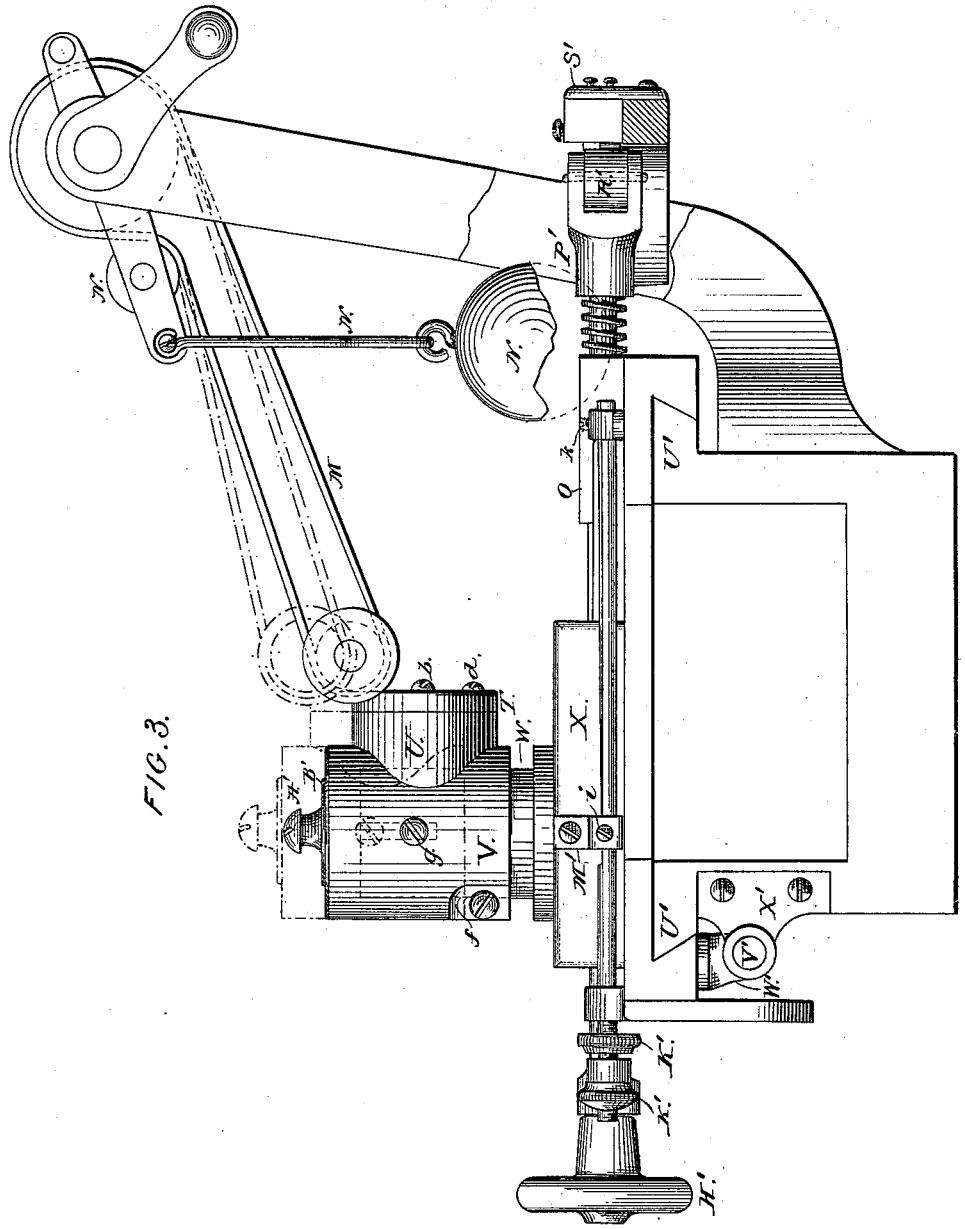

J. H. VINTON.
Machine for Cutting Screw Threads.
No. 233,821. Patented Oct. 26, 1880.
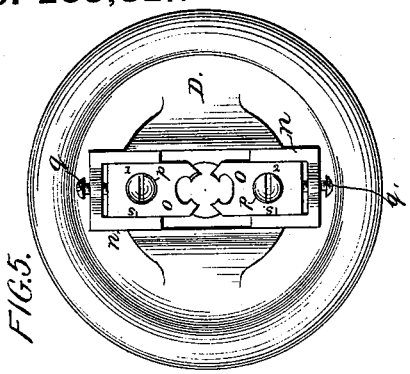
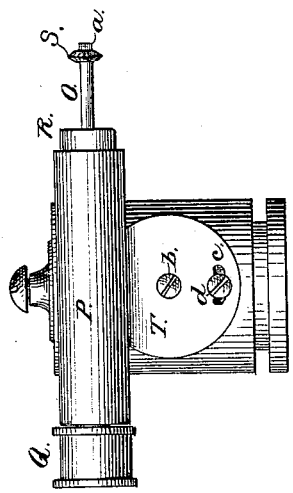
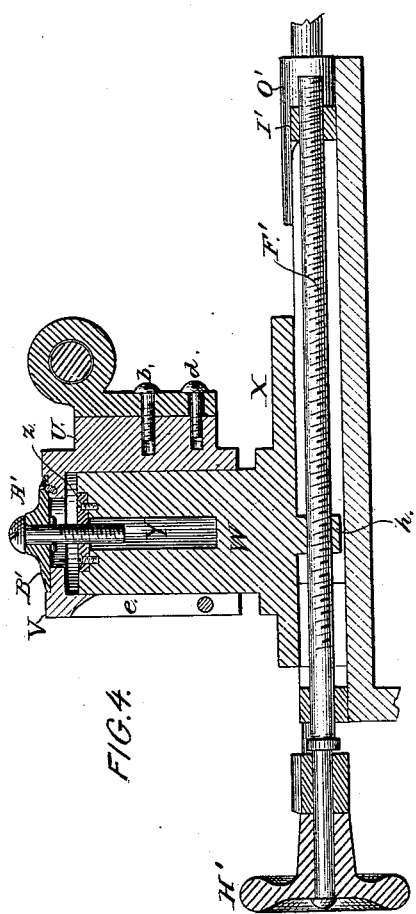
WITNESSES
INVENTOR
John H. Vinton.
By ATTORNEY

UNITED STATES PATENT OFFICE.

JOHN H. VINTON, OF BRIDGEPORT, CONNECTICUT, ASSIGNOR TO FRANK ARMSTRONG, OF SAME PLACE.

MACHINE FOR CUTTING SCREW-THREADS.

SPECIFICATION forming part of Letters Patent No. 233,821, dated October 26, 1880.

Application filed November 12, 1879.

*To all whom it may concern:*

Be it known that I, JOHN H. VINTON, of Bridgeport, in the county of Fairfield and State of Connecticut, have invented certain new and useful Improvements in Machines for Cutting Screw-Threads; and I do hereby declare that the following is a full and exact description thereof, reference being had to the accompanying drawings, making a part of this specification.

My invention relates to certain improvements in machines for cutting screw-threads, and more particularly to cutting the threads in dies intended for cutting threads on the ends of pipes or bolts, in which one or more tapers are given to the threads.

Prior to my invention the only way in which one or more tapered threads could be cut in a die has been by tapping with two differently-tapered taps, or in a lathe with a single stationary tool or chaser, which involves considerable labor, time, and care, and in such method there is a limit that cannot be passed, as a tap could not be made to rotate to cut a very steep taper.

The object of my invention is to overcome these objections, and to produce a machine by which one or more tapers may be cut automatically through the medium of a rotary cutter and former, and with these ends in view my invention consists in the peculiar construction and arrangement of mechanism hereinafter described.

In order that those skilled may know how to make and use my improved machine, I will proceed to describe its construction and operation, referring by letters to the accompanying drawings, in which—

Figure 1 is a front view of a machine embodying my invention. Fig. 2 is a plan or top view of the same. Fig. 3 is a side elevation looking in the direction of the arrow at Fig. 2, and only up to the dotted line. Fig. 4 is a vertical section through the carriage at the line *x x*, Fig. 2. Fig. 5 is a front view of the die-chuck with a pair of dies which have been duly cut arranged therein. Fig. 6 is a rear view of the tool-arbor and its support.

Similar letters indicate like parts in the several figures.

A is the bed of the machine, and B B suitable ordinary bearings for the rotary shaft C, to which is secured, in the ordinary manner, the chuck D.

E is the drive-shaft, from which, by pulleys F F and belts G G, or in any other suitable manner, power and motion are applied to the pulleys H H on the shaft C through a shifting-clutch, I, which is operated by any suitable shifting device, K.

L is a drive-pulley on the shaft E, and from which rotary motion is communicated through a belt, M, and suitable tightening device, N, to the rear end of a rotary tool-holder, O, arranged in an arbor, P, and held therein by the pulley Q and collar R.

S is a removable rotary cutter, secured to the tool-holder O by a screw, *a′*, in the ordinary manner.

The arbor P is formed with a vertical circular projection, T, which is pivoted at its center with a screw-bolt, *b*, so as to be capable of rotary adjustment thereon, a segmental slot, *c*, and set-screw, *d*, permitting such movement, and providing a means for fixing it in any given adjustment, as will be more fully explained hereinafter. This projection T is pivoted, as described, to a horizontal cylindrical arm, U, projecting rearward from a hollow cylinder or head, V, split on one side at *e* and provided with a tightening screw-bolt, *f*. This hollow cylinder or head is arranged over and around a solid cylindrical post, W, secured to or formed with a bed-plate, X.

A central hole or channel, Y, is formed in the post W, and a screw-nut and plate, Z, are secured in position over the top thereof, and in which runs a screw-bolt, A′, arranged centrally within a collar, B′, in the top of the cylinder-head V, so that the latter may be raised and lowered, and with it the arbor P, a screw-bolt, *g*, the point of which lies in a vertical channel in the post, preventing any rotary motion of the cylindrical head. (See Fig. 3.)

Any wear between the cylinder-head and post is taken up by the tightening-screw *f*.

The bed plate or carriage X travels on dovetail ways C′ C′, arranged longitudinally on the transversely-movable carriage D′, arranged with dovetail slides on the bed A of the machine.

On the top front edge of the carriage D′ is secured or formed a bar or plate, E', through which passes a long screw, F', the front end passing through a yoke, G', and provided with a hand-wheel, H'. The rear end of this screw passes loosely through another yoke, I', arranged at the rear end of the carriage D'. The threads of the screw travel in a threaded hanger or nut, $h$, Fig. 4, arranged on the under side of the plate or arbor carriage X, and consequently the rotation of the screw will cause the carriage and arbor referred to to travel back and forth. This movement is limited by the two check-nuts K K', arranged each side of the yoke G' on the threaded end of a side bar, L', which passes through a bracket-bearing, M', on the side of the carriage X, and through a bearing in the rear yoke, I'. The carriage X may be held against reciprocation by screws $i$ and $k$, or either of them. (See Fig. 3.)

On the opposite side of the carriage X a push-bar, N', is arranged with its front end fixed to the yoke G', and its rear end passing through a sleeve-bearing or guide, O', arranged on rear yoke, I', and provided with a head, P', between which and a suitable annular shoulder in the guide O' is arranged a spring, Q', the effect of which is to draw the carriage X rearward. This head P' is furnished with an anti-friction wheel or pulley, R', (see Fig. 3,) which travels over a former (shown, in dotted lines, within a box or frame, S') arranged on a cross-bar, T', at the rear of the machine. This former may be made in any design and of one or more parts, and adjusted by set-screws $l\ l$, and, as the carriage D' is fed toward the chuck D in the manner presently explained, the rotary cutter S will be moved back and forth to the extent of the profile of the former.

The carriage D', as before stated, is arranged on dovetail ways U', (see Fig. 3,) and is caused to travel toward or from the chuck D by a feed-screw, V', passing through a screw-nut or hanger, W', on the under side of the carriage. One end of the feed-screw has its bearing in a collar-bracket, X', and the other end in a bracket, Y', and is held against longitudinal movement by a collar, Z'. This feed-screw and the chuck are operated by a system of gears, 1 2 3, such as are usually employed on an engine-lathe, and by which the feed of the carriage D' and the speed of the chuck may be regulated to cut any number of threads wanted.

I have shown the clutch I as operated from a rock-shaft by a bell-crank lever, K, the horizontal arm of which may be automatically lifted to shift the clutch by a wedge or incline, $m$, secured to the carriage D'; but any other means may be used to accomplish this result.

As this machine is particularly designed to make screw-cutting dies with one or more tapers, I have shown the blanks properly secured in position within a suitable holder, $n$, arranged on a chuck.

The blanks $o\ o$ are held in any given position by screws $p\ p$, the diameters of which are sufficiently smaller than the holes in the blanks through which they pass to permit of the required or necessary longitudinal adjustment, which is produced by the screws $q\ q$ in the heads or ends of the holder $n$. Each end of the holder is numbered or otherwise marked in accordance with marks on the die-blanks, so that every successive pair operated upon can be arranged in the holder so that the cutter will begin its work exactly at the same place, whereby each half of a die is always interchangeable with the corresponding half of any other one. Any other suitable or obviously other necessary marks may be employed to regulate and determine the adjustment of the blanks with the screws $q\ q$.

Having described the construction and arrangement of the several parts of my improved machine, I will now proceed to describe its operation.

The several parts being properly adjusted and geared, and the blanks arranged in the chuck with the clutch locked with right-hand pulley H' and the former adjusted in the form-box S', the machine is started, and the rotary cutter is driven toward the left by the system of belts and pulleys, and at the same time the feed-screw V', causing the carriage D' to travel toward the chuck, the cutter is brought gradually to work upon the blanks, the axis of motion of the cutter being changed according to the profile of the former, the inclination or taper of the thread being cut is correspondingly changed. This movement of the arbor-carriage X is induced by the push-bar N', yoke G', and screw F', connected as described.

In order to prevent the mutilation of the threads by the rotary cutter, which would necessarily occur if the axis of the tool were coincident or parallel with the axis of the chuck, the tool-arbor P is rotated upon the pivot-screw $b$, (see Fig. 6,) below a horizontal plane, to cut a right-hand, and above to cut a left-hand, thread, and it is secured in either proper position by tightening the screw $d$.

When the cutter has finished its work the incline has lifted the horizontal end of the bell-crank lever K of the shifting device and caused the clutch to move between the pulleys H H, leaving them both free to rotate on their shaft without rotating the chuck D or causing any further movement of the carriage D'; hence the cutter will simply revolve without doing any work. This being observed by the attendant, he moves the cutter to the exact center, or so that it will be free to travel back without touching the threads it has cut, by turning the hand-wheel H' until the yoke G' comes in contact with the check-nut K', when the clutch I is shifted toward and in contact with the outside pulley, H, when the motion of the shaft C is reversed and the carriage D' run back to the position from which it started; and it will be understood that when the cutter next approaches the chuck it will be in exactly the same manner as the preceding time, and hence it follows that if the No. 1 half of die-blank is put in its correspondingly-numbered end of the holder n, and No. 2 half of blank in No. 2 end of holder, the cutter will begin its work at precisely the same point where it began on the previous operation; and hence, if this rule is followed, every half of a screw-cutting die made by machine will be interchangeable with another correspondingly-numbered half, so that should one half of a die become broken it can be readily replaced. This I consider a very important result in the use of my machine.

While my present machine, as illustrated in the drawings, is designed for making screw-cutting dies, it will be observed that it can be used with great facility to cut threads on bolts or screws by properly securing the blanks within a chuck and altering the forms in the form-box S'. In fact, the rotary cutter may be made to cut any profile, inside or out, according to the profile of the form, and much more expeditiously, and with less wear to the tool, than is the case with a stationary tool or chaser, according to the number of cutting-points on the rotary cutter, as the work is divided among the said several cutting-points.

I do not wish to be confined to the exact features of construction herein shown and described, as they may be varied in many particulars without departing from the spirit of my invention, the gist of which lies in so arranging and combining a rotary cutter with a revolving chuck and a former that a screw-thread of one or more tapers or a profile may be cut therewith, as already stated.

What I claim as new, and desire to secure by Letters Patent, is—

1. In a machine for cutting screw-threads, the combination of the following elements: a rotary spindle and chuck, D, carriage D', and carriage X, connected together by gears 1 2 3, and screw-feed V', a rotary cutter secured to an adjustable arbor mounted on the carriage X, a former-box and formers, and the push-bar N', all arranged relatively, substantially as and for the purpose set forth.

2. The carriage X, mounted on the carriage D', in combination with the yoke G', plates E' and I', side bar, L', push-bar N', spring Q', head P', and adjustable formers, substantially as and for the purpose set forth.

3. The combination and arrangement of the arbor P, adjustably secured to the extension U, the split cylinder V, the post W, and carriage X, substantially as and for the purposes hereinbefore set forth.

4. The arbor P, mounted, as described, upon the extension of the adjustable split cylinder, secured by the post W to the carriage X, in combination with the screw F', whereby the cutter is moved out of contact with the work to facilitate the return of the carriage, as set forth.

5. The combination and arrangement, with the carriage X, push-bar N', yoke G', and plates E' I', of the side bar, L, and check-nuts K K', substantially as and for the purpose set forth.

In testimony whereof I have hereunto set my hand this 3d day of November, A. D. 1879.

JOHN H. VINTON.

In presence of—
A. W. KIRSCH,
THEO. COURTRIGHT.